(12) United States Patent
Doosttalab

(10) Patent No.: US 11,525,430 B2
(45) Date of Patent: Dec. 13, 2022

(54) WIND TURBINE ROTOR BLADE WITH TWO ROWS OF VORTEX GENERATORS

(71) Applicant: Nordex Energy SE & Co. KG, Hamburg (DE)

(72) Inventor: Mehdi Doosttalab, Norderstedt (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 17/563,868

(22) Filed: Dec. 28, 2021

(65) Prior Publication Data

US 2022/0213866 A1    Jul. 7, 2022

(30) Foreign Application Priority Data

Jan. 7, 2021   (EP) ..................................... 21150476

(51) Int. Cl.
  *F03D 1/06*      (2006.01)
(52) U.S. Cl.
  CPC ...... *F03D 1/0633* (2013.01); *F05B 2240/304* (2020.08); *F05B 2240/3062* (2020.08)
(58) Field of Classification Search
  CPC .... F03D 1/0633; F03D 1/0641; F03D 1/0675; F03D 1/0683; F05B 2240/304; F05B 2240/3062
  See application file for complete search history.

(56) References Cited

U.S. PATENT DOCUMENTS

| 7,914,259 | B2 * | 3/2011 | Godsk ................... | F03D 1/0641 |
| | | | | 416/228 |
| 8,182,231 | B2 * | 5/2012 | Corten .................. | F03D 7/0256 |
| | | | | 416/61 |
| 8,916,795 | B2 * | 12/2014 | McClure ............... | B64C 23/005 |
| | | | | 219/121.48 |
| 9,752,559 | B2 * | 9/2017 | Herr ......................... | B64C 3/58 |
| 10,400,744 | B2 * | 9/2019 | Herrig ................... | F03D 1/0641 |
| 10,808,676 | B2 * | 10/2020 | Harada ................. | F03D 1/0633 |
| 10,982,647 | B2 * | 4/2021 | Fukami ................. | F03D 1/0691 |
| 11,236,722 | B2 * | 2/2022 | Oerlemans ............ | F03D 1/0675 |
| 2010/0008787 | A1 | 1/2010 | Godsk | |
| 2011/0229321 | A1 | 9/2011 | Kilaras | |
| 2015/0003985 | A1 | 1/2015 | Caruso et al. | |

(Continued)

FOREIGN PATENT DOCUMENTS

| EP | 2 129 908 B1 | 12/2009 |
| EP | 2 933 475 B1 | 10/2015 |

(Continued)

*Primary Examiner* — Courtney D Heinle
*Assistant Examiner* — Sang K Kim
(74) *Attorney, Agent, or Firm* — Walter Ottesen, P.A.

(57) ABSTRACT

A wind turbine rotor blade includes a first row of vortex generators having two adjacent vortex generators each having a longitudinal axis and two first fins having trailing ends arranged in a distance d from each other. The two longitudinal axes define a center line. A second row of vortex generators includes a second fin having a trailing end arranged closer to the center line than a leading end of the second fin. The second fin is arranged on the same side of the center line as the first fin such that the trailing end of the second fin is arranged in a chordwise distance c from the trailing end of that first fin. A distance x of the trailing end of the second fin from the center line is within a certain defined range.

13 Claims, 3 Drawing Sheets

(56) References Cited

U.S. PATENT DOCUMENTS

| | | |
|---|---|---|
| 2015/0292476 A1 | 10/2015 | Obrecht et al. |
| 2016/0177914 A1 | 6/2016 | Enevoldsen et al. |
| 2019/0120204 A1 | 4/2019 | Harada |
| 2019/0120205 A1 | 4/2019 | Harada |

FOREIGN PATENT DOCUMENTS

| | | |
|---|---|---|
| EP | 3 037 656 B1 | 6/2016 |
| EP | 3 473 849 A1 | 4/2019 |
| EP | 3 473 850 A1 | 4/2019 |

\* cited by examiner

WIND TURBINE ROTOR BLADE WITH TWO ROWS OF VORTEX GENERATORS

CROSS REFERENCE TO RELATED APPLICATION

This application claims priority of European patent application no. 21 150 476.6, filed Jan. 7, 2021, the entire content of which is incorporated herein by reference.

TECHNICAL FIELD

The disclosure relates to a wind turbine rotor blade with two rows of vortex generators.

BACKGROUND

For optimum performance under various operating conditions, wind turbine rotor blades need to fulfil complex structural and aerodynamic requirements. With regard to the profile thickness, for example, a compromise has to be made between aerodynamic and structural performance. In an inner radius section of wind turbine rotor blades, structural requirements call for profiles having a large relative thickness of more than, for example, 30%, while the strong curvature of these profiles may lead to flow separation. Flow separation has also been observed in various other surface regions of wind turbine rotor blades. To counteract such flow separation, it is well known to place vortex generators on the blade surface.

The vortex generators are positioned obliquely, so that they have an angle of attack with respect to the local airflow, in order to create a vortex which draws energetic, rapidly moving outside air into the slow-moving boundary layer in contact with the blade surface. Vortex generators are used to trigger the transition from laminar flow to turbulent flow. A turbulent boundary layer is less likely to separate than a laminar one. As a consequence, a higher lift can be obtained. However, the vortex generators at the same time increase drag. For best results, vortex generators are generally positioned just before an imaginary line where flow separation is expected.

US 2016/0177914 discloses a wind turbine rotor blade having a main vortex generator configured to generate a main vortex and a secondary vortex generator configured to generate a second vortex, wherein the main vortex generator has a greater height than the secondary vortex generator.

US 2010/0008787 discloses a wind turbine rotor blade with two rows of vortex generators. The vortex generators of both rows have a relatively small height and for this reason are called micro vortex generators.

SUMMARY

Starting therefrom, it is an object of the disclosure to improve the aerodynamic efficiency of a wind turbine rotor blade having two rows of vortex generators.

This object can, for example, be achieved by a wind turbine rotor blade having a rotor blade body having a blade root, a blade tip, a leading edge, and a trailing edge; a first row of vortex generators; a second row of vortex generators; the first row of vortex generators and the second row of vortex generators extending in a spanwise direction; the first row of vortex generators being arranged closer to the leading edge than the second row of vortex generators; the first row of vortex generators including a first vortex generator defining a first longitudinal axis extending in a chordwise direction and a second vortex generator defining a second longitudinal axis extending in a chordwise direction; the first vortex generator and the second vortex generator being mutually adjacent; the first vortex generator including a first fin and a second fin arranged symmetrically to the first longitudinal axis; the second vortex generator including a third fin and a fourth fin arranged symmetrically to the second longitudinal axis; each of the first fin, the second fin, the third fin, and the fourth fin having a respective leading end and a respective trailing end; the trailing ends of the first fin and the second fin being arranged at a distance d to each other; the distance d being greater than a distance between the leading end of the first fin and the leading end of the second fin; the first longitudinal axis and the second longitudinal axis being arranged at a distance D from each other and mutually defining a center line extending in a chordwise direction; the second row of vortex generators including a fifth fin having a fifth fin leading end and a fifth fin trailing end, wherein the fifth fin trailing end is arranged closer to the center line than the fifth fin leading end; the fifth fin being positioned in relation to the first fin, which is arranged on a same side of the center line as the fifth fin, with the fifth fin trailing end closer to the center line than the fifth fin leading end such that the fifth fin trailing end is arranged at a chordwise distance c from the trailing end of the first fin; wherein a distance x of the fifth fin trailing end from the center line is within a range between (i) an upper limit $x_U$ defined by:

| | |
|---|---|
| $x_U \leq 0.30\ D$ | for $c > 1.43\ D - 3.57\ d$ |
| $x_U \leq D/2 - d/2 - 0.14\ c$ | for $c \leq 1.43\ D - 3.57\ d$; and, |

(ii) a lower limit $x_L$ defined by

| | |
|---|---|
| $x_L \geq 0.07\ D$ | for $c > 0.75\ D - 0.87\ d$ |
| $x_L \geq D/2 - d/2 - 0.58\ c$ | for $c \leq 0.75\ D - 0.87\ d$. |

The wind turbine rotor blade has a blade root, a blade tip, a leading edge, a trailing edge, a first row of vortex generators and a second row of vortex generators, wherein the first row and the second row extend in a generally spanwise direction and the first row is arranged closer to the leading edge than the second row, wherein the first row includes two adjacent vortex generators each having a longitudinal axis extending in a generally chordwise direction and two first fins arranged symmetrically to the longitudinal axis, wherein each of the two first fins has a leading end and a trailing end, wherein the trailing ends are arranged in a distance d from each other, wherein the distance d is larger than a distance between the leading ends, wherein the two longitudinal axes are arranged in a distance D from each other and define a center line extending in a generally chordwise direction, wherein the second row of vortex generators includes a second fin having a leading end and a trailing end, wherein the trailing end is arranged closer to the center line than the leading end, wherein the second fin is positioned with reference to the first fin that is arranged on the same side of the center line as the second fin and with its trailing end closer to the center line than its leading end such that the trailing end of the second fin is arranged in a chordwise distance c from the trailing end of that first fin, wherein a distance x of the trailing end of the second fin from the center line is within a range between
(i) an upper limit $x_U$ defined by:

| | |
|---|---|
| $x_U \leq 0.30\ D$ | for $c > 1.43\ D - 3.57\ d$ |
| $x_U \leq D/2 - d/2 - 0.14\ c$ | for $c \leq 1.43\ D - 3.57\ d$ and |

(ii) a lower limit $x_L$ defined by

| | |
|---|---|
| $x_L \geq 0.07\ D$ | for $c > 0.75\ D - 0.87\ d$ |
| $x_L \geq D/2 - d/2 - 0.58\ c$ | for $c \leq 0.75\ D - 0.87\ d$. |

The wind turbine rotor blade in particular is configured for a wind turbine rotor with a horizontal axis. The blade root can be adapted for being fastened on a rotor hub. The spanwise direction generally extends from the blade root towards the blade tip, in particular parallel to a pitch axis or longitudinal axis of the wind turbine rotor blade. The wind turbine rotor blade has an aerodynamic profile with a suction side, a pressure side and a chord extending between a profile leading edge and a profile trailing edge. The chordwise direction corresponds to the direction of this chord, and is perpendicular to the longitudinal axis/pitch axis of the wind turbine rotor blade.

The first row and the second row of vortex generators extend in a generally spanwise direction. In other words, the vortex generators of each row are placed along a line on the wind turbine rotor blade surface running from a first point closer to the blade root to a second point closer to the blade tip. These lines may be straight and/or parallel to the longitudinal axis/pitch axis of the wind turbine rotor blade. However, they may as well be inclined with regard to the longitudinal axis/pitch axis and/or include a curvature and/or one or more kinks. For example, the lines may be positioned at a fixed distance from the leading edge, either in absolute terms or in relation to the chord length varying in the spanwise direction. The distance from the leading edge may also vary in the spanwise direction, for example, it may increase with increasing distance from the blade root. In this context, the feature that the first row is arranged closer to the leading edge than the second row means that a vortex generator of the first row at a given spanwise position is closer to the leading edge than a vortex generator of the second row at substantially the same spanwise position, so that the air flow reaches the second row only after having passed the first row.

The first row includes a plurality of vortex generators each having a longitudinal axis arranged in a generally chordwise direction. In other words, the vortex generators are aligned with a direction of the surrounding air flow, wherein some deviation between the direction of air flow, the longitudinal axis and/or the chordwise direction is possible.

Each vortex generator of the first row includes two first fins placed symmetrically with regard to its longitudinal axis. The first fins may be connected to each other via a base plate or via any other supporting structure mounted to the wind turbine rotor blade surface, but they may as well be mounted individually on the wind turbine rotor blade surface, without any other connecting member between the two first fins.

The first fins as well as the second fin may be essentially planar, but they may also include some curvature. They are placed at an angle with reference to the longitudinal axis and hence to the direction of air flow. This angle may be in a range of about 10° to about 40°, for example. The fins may be placed generally perpendicular to a wind turbine rotor blade surface, in particular on the suction side. Each of the fins has a leading end and a trailing end, based upon where the air flow passes first. The leading end is the foremost part of the fin, the trailing end is the backmost part of the fin. As the fin may have any shape, for example, rectangular, triangular, trapezoidal and/or including some curvature, the leading end may be a point or an edge. The same holds for the trailing end. The distance d is measured between the trailing ends of the first fins of a vortex generator of the first row of vortex generators. It corresponds to the overall width of these vortex generators.

The longitudinal axes of two adjacent vortex generators of the first row define a center line arranged halfway between the two longitudinal axes. If the longitudinal axes are exactly parallel, the center line will be parallel to both of them. It is also possible that an angle is formed between the two longitudinal axes, should one or both of them deviate from the chordwise direction, for example, by a few degrees. In this case, the center line will be a bisecting line.

The vortex generators of the second row include a second fin having a leading end and a trailing end, wherein the trailing end is arranged closer to the center line. For defining the position of the trailing end of the second fin, reference is made to the position of the trailing end one of the first fins, namely of the first fin that is on the same side of the center line and also has its trailing end closer to the center line than its leading end. The chordwise distance between the trailing end of this first fin and the trailing end of the second fin is denoted distance c. It is measured along the wind turbine rotor blade surface, which may include some curvature. Hence, the chordwise distance c may not follow a straight line, but corresponds to an overall direction of air flow.

In accordance with the disclosure, the spanwise position of the trailing end of the second fin lies in a specified area defined in terms of the spanwise distance x of this trailing end from the center line. The spanwise distance x shall be measured along the wind turbine rotor blade surface as well, as has been explained for the chordwise distance c. The range of the spanwise distance x within the specified area is defined by upper and lower limits which depend on the chordwise distance c as indicated above. Both limits include a fixed value for the spanwise distance x which applies further away from the first row, and a value depending linearly on the chordwise distance c which applies closer to the first row. Together, the upper and lower limits define a strip-shaped surface area beginning at the trailing end of the specified first fin of the vortex generator of the first row, and then broadening with increasing distance from this trailing end.

In operation, the area defined by the upper and lower limits corresponds to an extension of a vortex generated by the first fin. When the second fin has the same orientation with reference to the direction of air flow as the first fin, it tends to generate a vortex with the same rotation direction, either clockwise or counter-clockwise. Placing the trailing end of the second fin in the specified area therefore does not generate a new vortex, but rather strengthens or re-energizes the vortex generated by the first fin. For this reason, it is believed that the second row of vortex generators helps in avoiding flow separation while generating less additional drag than a second row of vortex generators placed outside of the specified area.

In an aspect of the disclosure, the upper limit $x_U$ is defined by

| | |
|---|---|
| $x_U \leq 0.18\ D$ | for $c > 1.19\ D - 1.87\ d$ |
| $x_U \leq D/2 - d/2 - 0.27\ c$ | for $c \leq 1.19\ D - 1.87\ d$. |

This means the area in which the trailing end of the second fin is placed is narrower, so that the strengthening of the vortex generated by the first fin is even more efficient and/or applies a larger range of operating conditions. The slope of −0.27 c corresponds to an angle α of 15° (see below explanation of FIG. 3).

In an aspect of the disclosure, the lower limit $x_L$ is defined by

| | |
|---|---|
| $x_L \geq 0.10\ D$ | for $c > 0.85\ D - 1.06\ d$ |
| $x_L \geq D/2 - d/2 - 0.47\ c$ | for $c \leq 0.85\ D - 1.06\ d$. |

This means the area in which the trailing end of the second fin is placed is even narrower, so that the strengthening of the vortex generated by the first fin is even more efficient and/or applies to an even larger range of operating conditions. The slope of −0.47 c corresponds to an angle β of 25° (see below explanation of FIG. 3).

In an aspect of the disclosure, the chordwise distance c is larger than the distance d, in particular larger than twice the distance d. It has been found that the vortex strengthening effect works best when the distance c is at least as large as the distance d.

In an aspect of the disclosure, the second row includes a plurality of second fins, wherein each of the second fins is arranged with reference to one of the first fins as defined above. In this way, each of the second fins strengthens a vortex generated by one of the first fins.

In an aspect of the disclosure, the two vortex generators of the first row are arranged in a longitudinal section of the wind turbine rotor blade in which the wind turbine rotor blade has an aerodynamic profile with a relative thickness of 0.35 or more. The relative thickness may also be 0.45 or larger. For this type of profiles, the second row of vortex generators is particularly useful.

In an aspect of the disclosure, the aerodynamic profile has a flat trailing edge. The flat trailing edge helps in limiting the curvature of the suction side and therefore avoiding flow separation. In combination with the positioning of the second fin, optimal aerodynamic efficiency can be obtained.

In an aspect of the disclosure, the flat trailing edge has a thickness of at least 2% of a chord length of the aerodynamic profile. The thickness may also be at least 10% or at least 15% of the chord length.

In an aspect of the disclosure, a vortex generator of the first row includes a base plate mounted on a wind turbine rotor blade surface, wherein the two first fins of the vortex generator are connected to the base plate. This type of vortex generator is easy to install.

In an aspect of the disclosure, a vortex generator of the second row includes a base plate mounted on a wind turbine rotor blade surface, wherein a single second fin is connected to the base plate. In other words, each of the second fins of the second row of vortex generators is installed via a separate base plate. The defined spanwise positions of the second fins may include relatively large distances between adjacent second fins. Installing the second fins individually via separate, relatively small base plates instead of in pairs with relatively wide base plates can therefore lead to less disturbance of the air flow between adjacent second fins.

BRIEF DESCRIPTION OF THE DRAWINGS

The invention will now be described with reference to the drawings wherein.

DESCRIPTION OF THE PREFERRED EMBODIMENTS

Figure 1:
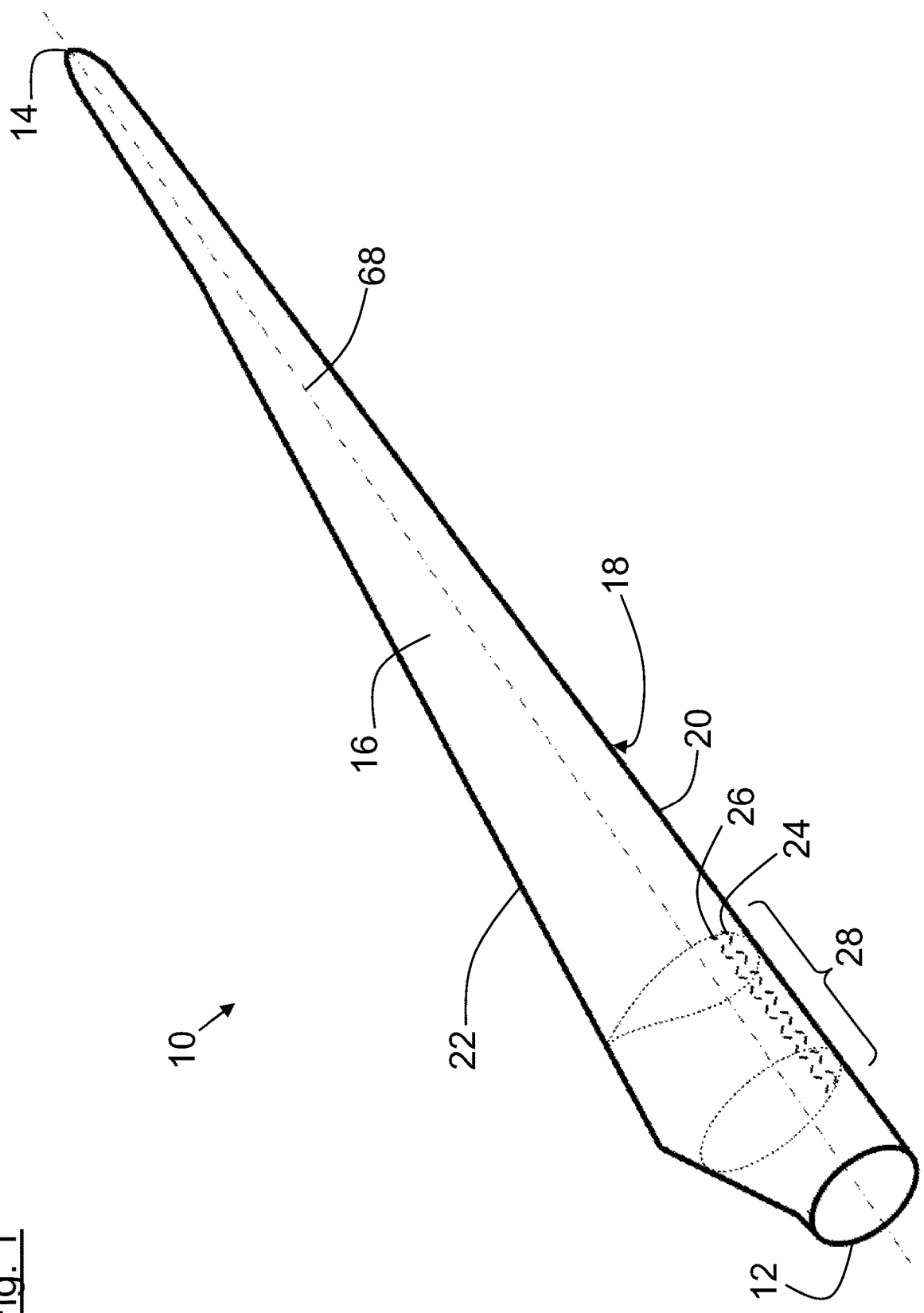
FIG. 1 is a wind turbine rotor blade in a schematic, perspective view.

The wind turbine rotor blade 10 of FIG. 1 has a blade root 12, a blade tip 14 and a pitch axis 68. The pitch axis 68 may also be referred to as longitudinal axis of the wind turbine rotor blade 10. At the blade root 12, the wind turbine rotor blade 10 has a cylindrical cross section and is adapted for attachment to a wind turbine rotor hub (not shown). The cross section with increasing distance from the blade root 12 transforms into an aerodynamic profile, as illustrated by the dotted lines. The surface of the wind turbine rotor blade 10 facing the viewer forms a suction side 16, the opposite surface of the wind turbine rotor blade 10 forms a pressure side 18. The pressure side 16 and the suction side 18 both extend from a leading edge 20 to a trailing edge 22.

A first row 24 of vortex generators and a second row 26 of vortex generators are arranged in a generally spanwise direction in a longitudinal section 28 of the wind turbine rotor blade 10, on the suction side 16. The first row 24 of vortex generators is positioned closer to the leading edge 20 than the second row 26 of vortex generators. In the embodiment of FIG. 1, each vortex generator of the first row 24 and of the second row 26 includes two fins. However, this is not mandatory in particular for the second row 26, in which one or more of the vortex generators may consist each of a single second fin only.

Figure 2:
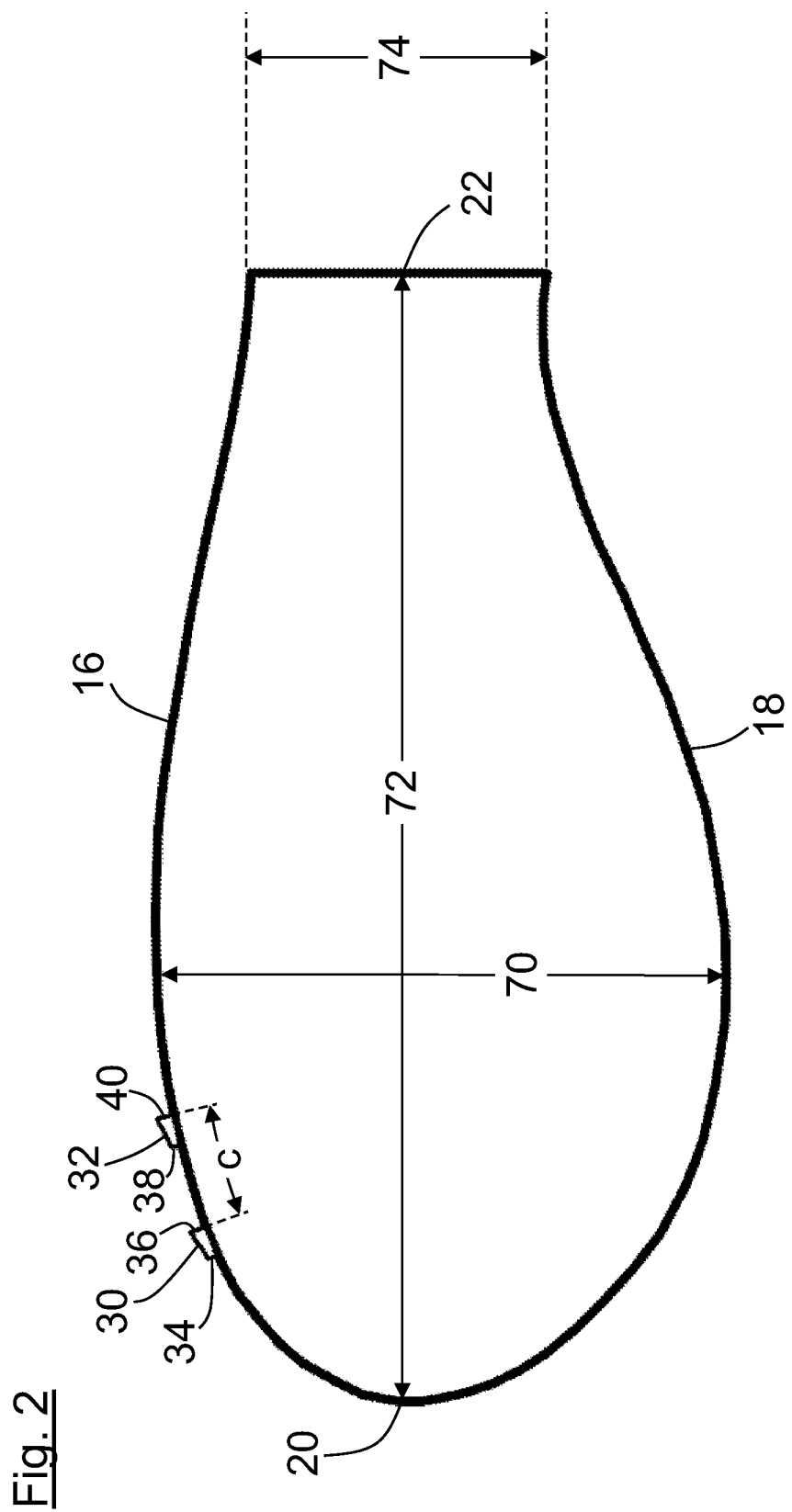
FIG. 2 shows the wind turbine rotor blade of FIG. 1 in cross section.

The cross section of FIG. 2 lies within the longitudinal section 28 of the wind turbine rotor blade 10, close to the blade root 12. At this longitudinal position, the aerodynamic profile has a relative thickness of about 40%, calculated as the profile thickness 70 divided by the chord length 72, and a flat trailing edge 22 with a height 74 of about 20% of the chord length 72.

On the suction side 16, one can see a first fin 30 of a vortex generator of the first row 24. The first fin 30 has a trapezoidal shape with a leading end 34 formed by a short edge arranged approximately perpendicular to the surface of the suction side 16, and a trailing end 36 arranged approximately perpendicular to the surface of the suction side 16. One can also see a second fin 32 of a vortex generator of the second row 26. The second fin 32 has a trapezoidal shape with a leading end 38 formed by a short edge arranged approximately perpendicular to the surface of the suction side 16, and a trailing end 40 arranged approximately perpendicular to the surface of the suction side 16. The chordwise distance c is measured between the trailing ends 36 and 40 along the wind turbine rotor blade's surface.

Figure 3:
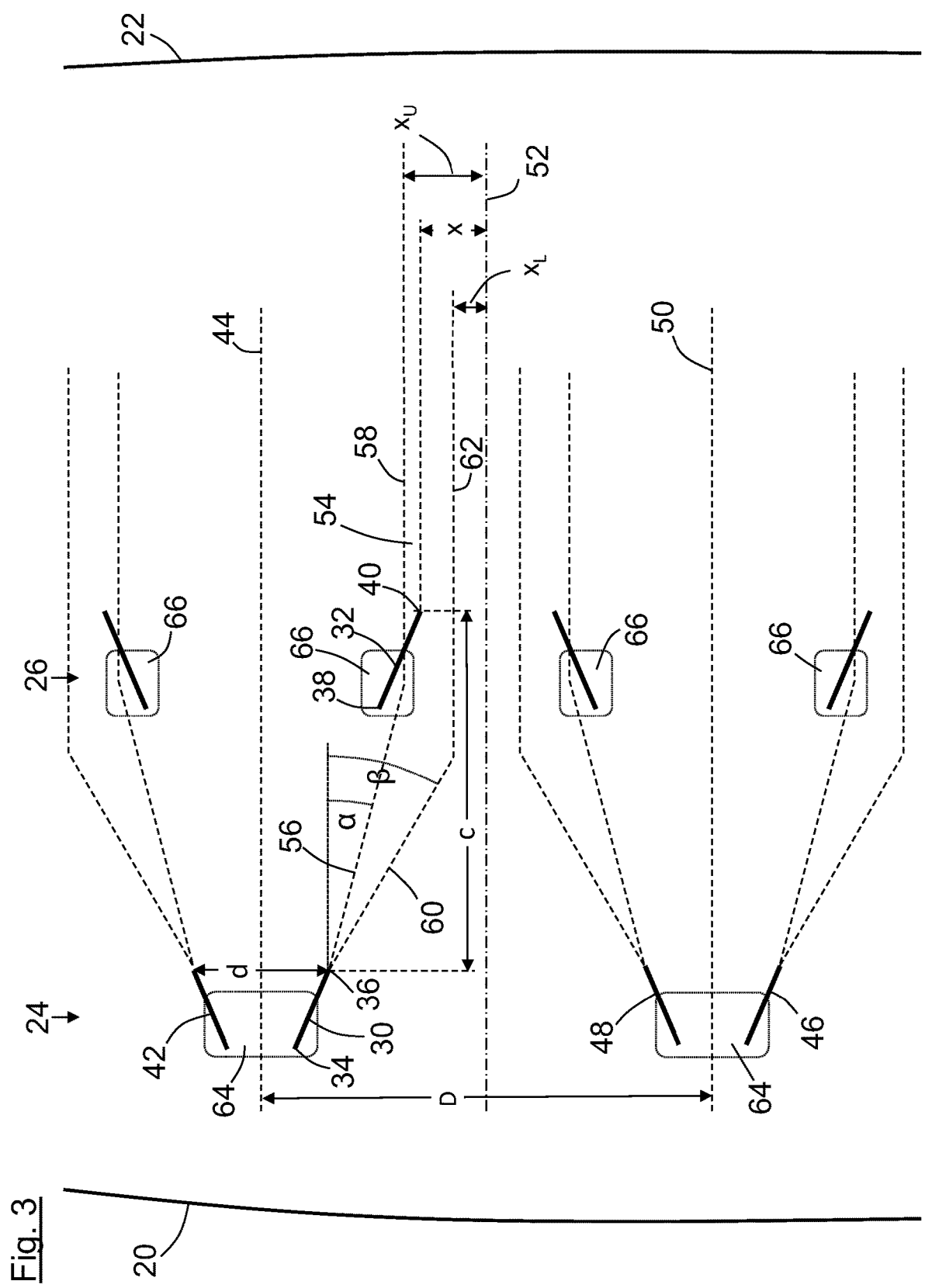
FIG. 3 shows the wind turbine rotor blade of FIG. 1 in a schematic view on a section of the suction side.

FIG. 3 shows the positions of the vortex generators in greater detail, looking onto a section of the suction side 16 of the wind turbine rotor blade 10. The leading edge 20 is shown to the left, the trailing edge 22 is shown to the right of FIG. 3. The first row 24 of vortex generators includes a vortex generator having a first fin 30 and a further first fin 42 arranged symmetrically to a longitudinal axis 44 of this vortex generator. The distance d is indicated between the trailing end 36 of first fin 30 and the trailing end of first fin 42. It corresponds to a width of the vortex generator.

Another, adjacent vortex generator of the first row 24 of vortex generators is arranged in a spanwise distance D. It includes two fins 46, 48 and a longitudinal axis 50. The longitudinal axes 44, 50 of both vortex generators of the first row 24 of vortex generators are arranged in a generally chordwise direction. They define a center line 52 arranged halfway between the longitudinal axes 44, 50. The spanwise distance D is measured between the longitudinal axes 44, 50.

The second row 26 of vortex generators includes a second fin 32 having a leading end 38 and a trailing end 40. The trailing end 40 is arranged in a spanwise distance x from the center line 52, and in a chordwise distance c from the trailing end 36 of the first fin 30. The trailing end 40 is arranged in a specific surface area 54 shown with a shading. The range of spanwise positions x within the surface area 54 is defined by an upper limit $x_U$ given by a first line 56 and a second line 58 and by a lower limit $x_L$ given by a third line 60 and a fourth line 62.

The first line 56 is described by the term $x_U = D/2 - d/2 - 0.14\,c$ and applies as an upper limit $x_U$ for the spanwise distance x where $c \leq 1.43\,D - 3.57\,d$. The slope of $-0.14\,c$ corresponds to an angle $\alpha = 8°$. The second line 58 is described by the term $x_U = 0.30\,D$.

The third line 60 is described by the term $x_L = D/2 - d/2 - 0.58\,c$ and applies as a lower limit $x_L$ for the spanwise distance x where $c \leq 0.75\,D - 0.87\,d$. The slope of $-0.58\,c$ corresponds to an angle $\beta = 30°$. The fourth line 62 is described by the term $x_L = 0.07\,D$.

When looking from the leading edge 20 at the air flow close to the suction side 16, the first fin 30 will generate a vortex rotating counter-clockwise and roughly covering the surface area 54 when flowing towards the trailing edge 22. The second fin 32 with its trailing end 40 arranged within this surface area 54 will not generate a new vortex, but will strengthen the vortex generated by the first fin 30.

One can see from FIG. 3 that each of the second fins included in the second row 26 of vortex generators is arranged with reference to one of the first fins 30, 42, 46, 48 of the first row 24 of vortex generators, as has been explained in detail for the second fin 32, that is in a specific surface area shown with a shading.

FIG. 3 also shows that the vortex generators of the first row 24 of vortex generators each include two first fins (30/42, and 46/48, respectively) connected to a common base plate 64, while each of the second fins of the vortex generators of the second row 26 of vortex generators is connected to a separate base plate 66.

It is understood that the foregoing description is that of the preferred embodiments of the invention and that various changes and modifications may be made thereto without departing from the spirit and scope of the invention as defined in the appended claims.

LIST OF REFERENCE NUMERALS 10 wind turbine rotor blade
12 blade root
14 blade tip
16 suction side
18 pressure side
20 leading edge
22 trailing edge
24 first row of vortex generators
26 second row of vortex generators
28 longitudinal section
30 first fin
32 second fin
34 leading end of first fin 30
36 trailing end of first fin 30
38 leading end of second fin 32
40 trailing end of second fin 32
42 first fin
44 longitudinal axis
46 first fin
48 first fin
50 longitudinal axis
52 center line
54 surface area
56 first line
58 second line
60 third line
62 fourth line
64 common base plate
66 separate base plate
68 pitch axis
70 profile thickness
72 chord length
72 height
$\alpha$, $\beta$ angles
x distance of the trailing end of the second fin from the center line
$x_U$ upper limit of the value x
$x_L$ lower limit of the value x

What is claimed is:

1. A wind turbine rotor blade comprising:
 a rotor blade body having a blade root, a blade tip, a leading edge, and a trailing edge;
 a first row of vortex generators;
 a second row of vortex generators;
 said first row of vortex generators and said second row of vortex generators extending in a spanwise direction;
 said first row of vortex generators being arranged closer to said leading edge than said second row of vortex generators;
 said first row of vortex generators including a first vortex generator defining a first longitudinal axis extending in a chordwise direction and a second vortex generator defining a second longitudinal axis extending in a chordwise direction;
 said first vortex generator and said second vortex generator being mutually adjacent;
 said first vortex generator including a first fin and a second fin arranged symmetrically to the first longitudinal axis;
 said second vortex generator including a third fin and a fourth fin arranged symmetrically to the second longitudinal axis;
 each of said first fin, said second fin, said third fin, and said fourth fin having a respective leading end and a respective trailing end;
 said trailing ends of said first fin and said second fin being arranged at a distance d to each other;
 said distance d being greater than a distance between said leading end of said first fin and said leading end of said second fin;
 the first longitudinal axis and said second longitudinal axis being arranged at a distance D from each other and mutually defining a center line extending in a chordwise direction;
 said second row of vortex generators including a fifth fin having a fifth fin leading end and a fifth fin trailing end, wherein said fifth fin trailing end is arranged closer to the center line than said fifth fin leading end;
 said fifth fin being positioned in relation to said first fin, which is arranged on a same side of the center line as said fifth fin, with said fifth fin trailing end closer to the center line than said fifth fin leading end such that said fifth fin trailing end is arranged at a chordwise distance c from said trailing end of said first fin;

wherein a distance x of said fifth fin trailing end from the center line is within a range between (i) an upper limit $x_U$ defined by:

| | |
|---|---|
| $x_U \leq 0.30\ D$ | for $c > 1.43\ D - 3.57\ d$ |
| $x_U \leq D/2 - d/2 - 0.14\ c$ | for $c \leq 1.43\ D - 3.57\ d$; and, |

(ii) a lower limit $x_L$ defined by

| | |
|---|---|
| $x_L \geq 0.07\ D$ | for $c > 0.75\ D - 0.87\ d$ |
| $x_L \geq D/2 - d/2 - 0.58\ c$ | for $c \leq 0.75\ D - 0.87\ d$. |

2. The wind turbine rotor blade of claim 1, wherein said upper limit $x_U$ is defined by

| | |
|---|---|
| $x_U \leq 0.18\ D$ | for $c > 1.19\ D - 1.87\ d$ |
| $x_U \leq D/2 - d/2 - 0.27\ c$ | for $c \leq 1.19\ D - 1.87\ d$. |

3. The wind turbine rotor blade of claim 1, wherein said lower limit $x_L$ is defined by

| | |
|---|---|
| $x_L \geq 0.10\ D$ | for $c > 0.85\ D - 1.06\ d$ |
| $x_L \geq D/2 - d/2 - 0.47\ c$ | for $c \leq 0.85\ D - 1.06\ d$. |

4. The wind turbine rotor blade of claim 2, wherein said lower limit $x_L$ is defined by

| | |
|---|---|
| $x_L \geq 0.10\ D$ | for $c > 0.85\ D - 1.06\ d$ |
| $x_L \geq D/2 - d/2 - 0.47\ c$ | for $c \leq 0.85\ D - 1.06\ d$. |

5. The wind turbine rotor blade of claim 1, wherein said chordwise distance c is greater than said distance d.

6. The wind turbine rotor blade of claim 1, wherein said chordwise distance c is greater than twice said distance d.

7. The wind turbine rotor blade of claim 1, wherein said second row of vortex generators includes a third vortex generator including said fifth fin and a sixth fin; and, said sixth fin being arranged and positioned relative to said second fin as said fifth fin is arranged and positioned relative to said first fin.

8. The wind turbine rotor blade of claim 1, wherein said second row of vortex generators includes a fourth vortex generator including a seventh fin and an eighth fin; said seventh fin being arranged and positioned relative to said third fin as said fifth fin is arranged and positioned relative to said first fin; and, said eighth fin being arranged and positioned relative to said fourth fin as said fifth fin is arranged and positioned relative to said first fin.

9. The wind turbine rotor blade of claim 1, wherein said first vortex generator and said second vortex generator are arranged in a longitudinal section of the wind turbine rotor blade in which the wind turbine rotor blade has an aerodynamic profile with a relative thickness of 0.35 or more.

10. The wind turbine rotor blade of claim 9, wherein said aerodynamic profile has a flat trailing edge.

11. The wind turbine rotor blade of claim 10, wherein said flat trailing edge has a thickness of at least 2% of a chord length of said aerodynamic profile.

12. The wind turbine rotor blade of claim 1, wherein said first vortex generator has a base plate; said base plate is mounted on a wind turbine rotor blade surface; and, said first fin and said second fin of said first vortex generator are connected to said base plate.

13. The wind turbine rotor blade of claim 1, wherein said fifth fin has a base plate; said base plate is mounted in a wind turbine rotor blade surface; and, said fifth fin is the only fin connected to said base plate.

* * * * *

UNITED STATES PATENT AND TRADEMARK OFFICE
CERTIFICATE OF CORRECTION

| | | |
|---|---|---|
| PATENT NO. | : 11,525,430 B2 | Page 1 of 1 |
| APPLICATION NO. | : 17/563868 | |
| DATED | : December 13, 2022 | |
| INVENTOR(S) | : Mehdi Doosttalab | |

It is certified that error appears in the above-identified patent and that said Letters Patent is hereby corrected as shown below:

In the Specification

In Column 8:
Line 19: delete "72" and substitute -- 74 -- therefor.

Signed and Sealed this
Eighteenth Day of April, 2023

Katherine Kelly Vidal
*Director of the United States Patent and Trademark Office*